United States Patent
Zhang

(10) Patent No.: US 11,025,760 B2
(45) Date of Patent: Jun. 1, 2021

(54) TERMINAL CAPABLE OF FACILITATING ASSEMBLY AND DISASSEMBLY OF DISPLAY PANEL

(71) Applicant: Wuhan China Star Optoelectronics Technology Co., Ltd., Wuhan (CN)

(72) Inventor: Bingchuan Zhang, Wuhan (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 394 days.

(21) Appl. No.: 16/097,623

(22) PCT Filed: Sep. 13, 2018

(86) PCT No.: PCT/CN2018/105586
§ 371 (c)(1),
(2) Date: Oct. 30, 2018

(87) PCT Pub. No.: WO2019/205436
PCT Pub. Date: Oct. 31, 2019

(65) Prior Publication Data
US 2021/0099558 A1 Apr. 1, 2021

(30) Foreign Application Priority Data

Apr. 27, 2018 (CN) .......................... 201810390107.X

(51) Int. Cl.
*H04M 1/02* (2006.01)
(52) U.S. Cl.
CPC ................................ *H04M 1/0266* (2013.01)

(58) Field of Classification Search
CPC .................................................. H04M 1/0266
(Continued)

(56) References Cited

U.S. PATENT DOCUMENTS 8,738,102 B2 * 5/2014 Ahn ...................... H04M 1/026
455/575.4
9,337,883 B1 * 5/2016 Wang ..................... H04R 7/045
(Continued)

FOREIGN PATENT DOCUMENTS

CN 102740623 A 10/2012
CN 103777817 A 5/2014
(Continued)

OTHER PUBLICATIONS

Machine English Translation of CA104252201. 5 pages. (Year: 2021).*

*Primary Examiner* — Don N Vo
(74) *Attorney, Agent, or Firm* — Leong C. Lei

(57) ABSTRACT

A terminal is disclosed. The terminal includes a display module, a terminal main body, and two sealing elements. A first main portion and two extension portions of the protection cover are enclosed to form a receiving space, and the display panel is mounted on a lower surface of the first main portion. The terminal main body is mounted in the receiving space, the terminal main body includes a second main portion, and the two sealing elements are mounted on both sides of the protection cover and terminal main body. When installing the display panel, only the terminal main body needs to be embedded in the receiving space of the protection cover, and then the sealing member can be fixed. When the display screen is disassembled, only the sealing member needs to be removed first, and then the terminal main body is removed from the receiving space of the protection cover.

8 Claims, 3 Drawing Sheets

(58) Field of Classification Search
USPC .......................................................... 455/566
See application file for complete search history.

(56) References Cited

U.S. PATENT DOCUMENTS

| | | | |
|---|---|---|---|
| 10,177,800 B2* | 1/2019 | Li | ........................ H01M 10/425 |
| 2010/0103138 A1 | 4/2010 | Huang | |
| 2016/0234949 A1* | 8/2016 | Seo | .......................... H05K 5/03 |

FOREIGN PATENT DOCUMENTS

| CN | 104252201 A | 12/2014 |
|---|---|---|
| CN | 104282721 A | 1/2015 |
| CN | 104850183 A | 8/2015 |
| CN | 108198516 A | 6/2018 |

\* cited by examiner

TERMINAL CAPABLE OF FACILITATING ASSEMBLY AND DISASSEMBLY OF DISPLAY PANEL

FIELD OF THE INVENTION

The present invention relates to a display technology field, and more particularly to a terminal.

BACKGROUND OF THE INVENTION

With the rapid development of display technology, the Liquid Crystal Display (LCD) and the Organic Light Emitting Diodes (OLED) have become mainstream display products on the market.

The LCD display has many advantages such as a thin body, power saving, and no radiation. The OLED display has advantages of thin, light, wide viewing angle, active light emission, continuously adjustable emission color, low cost, fast response speed, low energy consumption, low driving voltage, wide operating temperature range, simple production process, high luminous efficiency, and flexibility display. The LCD display and the OLED display have been used in a variety of consumer electronic products, especially mobile phones.

With the diversification of mobile phone functions, more and more users are using mobile phones, and the frequency of using mobile phones is getting higher and higher. Inevitably, the mobile phone may fall. Due to the relatively fragile mobile phone display panel, when the mobile phone is dropped, the display panel is easily to be broken, and the user has to replace the mobile phone display panel, so that many users have experienced for changing panel.

In the prior art, almost all of the mobile phone display panels and the middle frame of the mobile phone use a glue for fixing, which makes it difficult to disassemble the mobile phone display panel such that not only consumes high labor costs, but also causes a damage of the appearance of the phone to a certain extent no matter how a maintenance personnel carefully disassemble the mobile phone display panel, which will affect the overall appearance of the mobile phone.

SUMMARY OF THE INVENTION

The purpose of the present invention is to provide a terminal, which can facilitate the assembly and disassembly of the display screen, and the installation and disassembly of the display panel will not affect the overall appearance of the terminal.

In order to achieve the above purpose, the present invention provides a terminal, comprising: a display module, a terminal main body, and two sealing elements; wherein the display module includes a transparent protection cover and a display panel, the protection cover includes a first main portion and two extension portions that are opposite, disposed separately and extended from two ends of the first main portion, the first main portion and the two extension portions are enclosed to form a receiving space, and the display panel is mounted on a lower surface of the first main portion; wherein the terminal main body is mounted in the receiving space, the terminal main body includes a second main portion, and the second main portion is connected between the extension portion; and wherein the two sealing elements are mounted on both sides of the protection cover and the terminal main body.

Wherein each of the extension portions includes a first connection portion and a first extension portion, the first connection portion is connected between the first extension portion and the first main portion, and the first extension portion and the first main portion are disposed oppositely.

Wherein the terminal main body further includes two protrusion portions that are opposite, disposed separately, and extended from two ends of the second main portion, and the two protrusion portions are mounted in the receiving space; each of the protrusion portions includes a second connection portion and a second extension portion, and the second connection portion is connected between the second main portion and the second extension portion, the second extension portion is supported by the first connection portion, and the second connection portion is supported by the first extension portion.

Wherein the flexible buffering part 7 includes a first portion and a second portion, the first portion is located between the first extension portion and the second connection portion, and the second portion is located between the first connection portion and the second extension portion.

Wherein a cross section of the first connection portion is curve-shaped, and a cross section of each of the second portion and the second extension portion is also curve-shaped.

Wherein a cross section of the first extension portion is flat, a lower surface of the second main portion is aligned with a lower surface of the first extension portion.

Wherein a cross section of the first extension portion is arc-shaped, a lower surface of a cross section of the second main portion is arc-shaped, and a lower surface of the second main portion connects the lower surface of the first extension portion to form an arc shape with a smooth transition.

Wherein the display panel is an LCD display panel or an OLED display panel.

Wherein the buffering part is rubber or foam.

Wherein the two sealing elements are mounted on two sides of the protection cover and the terminal main body by buckling or screws.

The beneficial effect of the present invention: the terminal of the present invention is provided with a display module, a terminal main body, and two sealing elements. Wherein the display module includes a transparent protection cover and a display panel, and the display panel is mounted on a lower surface of the first main portion. Wherein the terminal main body is mounted in the receiving space, the terminal main body includes a second main portion, and the second main portion is connected between the two extension portions. Wherein the two sealing elements are mounted on both sides of the protection cover and the terminal main body. When installing the display panel, only the terminal main body needs to be embedded in the receiving space of the protection cover, and then the sealing member can be fixed. When the display screen is disassembled, only the sealing member needs to be removed first, and then the terminal main body is removed from the receiving space of the protection cover, which can facilitate the assembly and disassembly of the display panel, and the installation and disassembly of the display panel will not affect the overall appearance of the terminal and facilitate the user to replace the display panel.

BRIEF DESCRIPTION OF THE DRAWINGS

For a further understanding of the features and technical content of the present invention, please refer to the following detailed description of the invention and the accompanying drawings. However, the drawings are provided for reference and description only, and are not intended to limit the present invention.

In the drawings.

DETAILED DESCRIPTION OF PREFERRED EMBODIMENTS

In order to further illustrate the technical measures taken by the present invention and their effects, the following detailed description is made in conjunction with the preferred embodiments of the present invention and the accompanying drawings.

The terminal can be implemented in various forms. For example, the terminal described in the present invention may include, for example, a mobile phone, a smart phone, a notebook computer, a digital broadcast receiver, a PDA (personal digital assistant), a PAD (tablet computer), a PMP (portable multimedia player), a navigation device, and the like, which are terminals with communication function. In the following, it is assumed that the terminal is a mobile terminal. However, it will be understood by those skilled in the art that the configuration according to the embodiment of the present invention can also be applied to a fixed type terminal except the elements that are particularly used for the purpose of movement.

Figure 1:
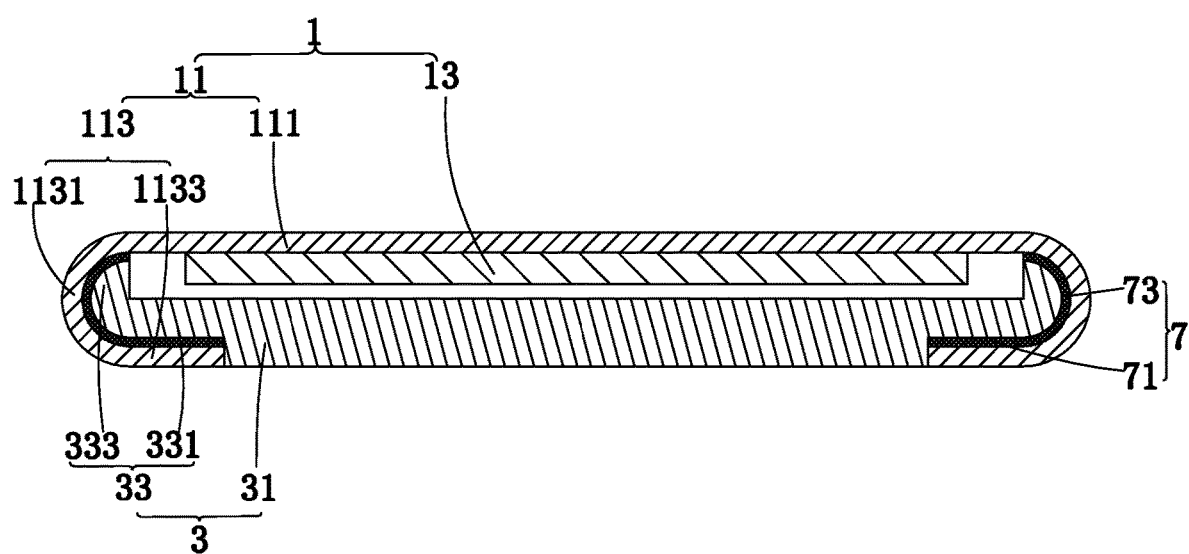
FIG. 1 is a schematic cross-sectional view of a terminal according to the present invention.
Figure 2:
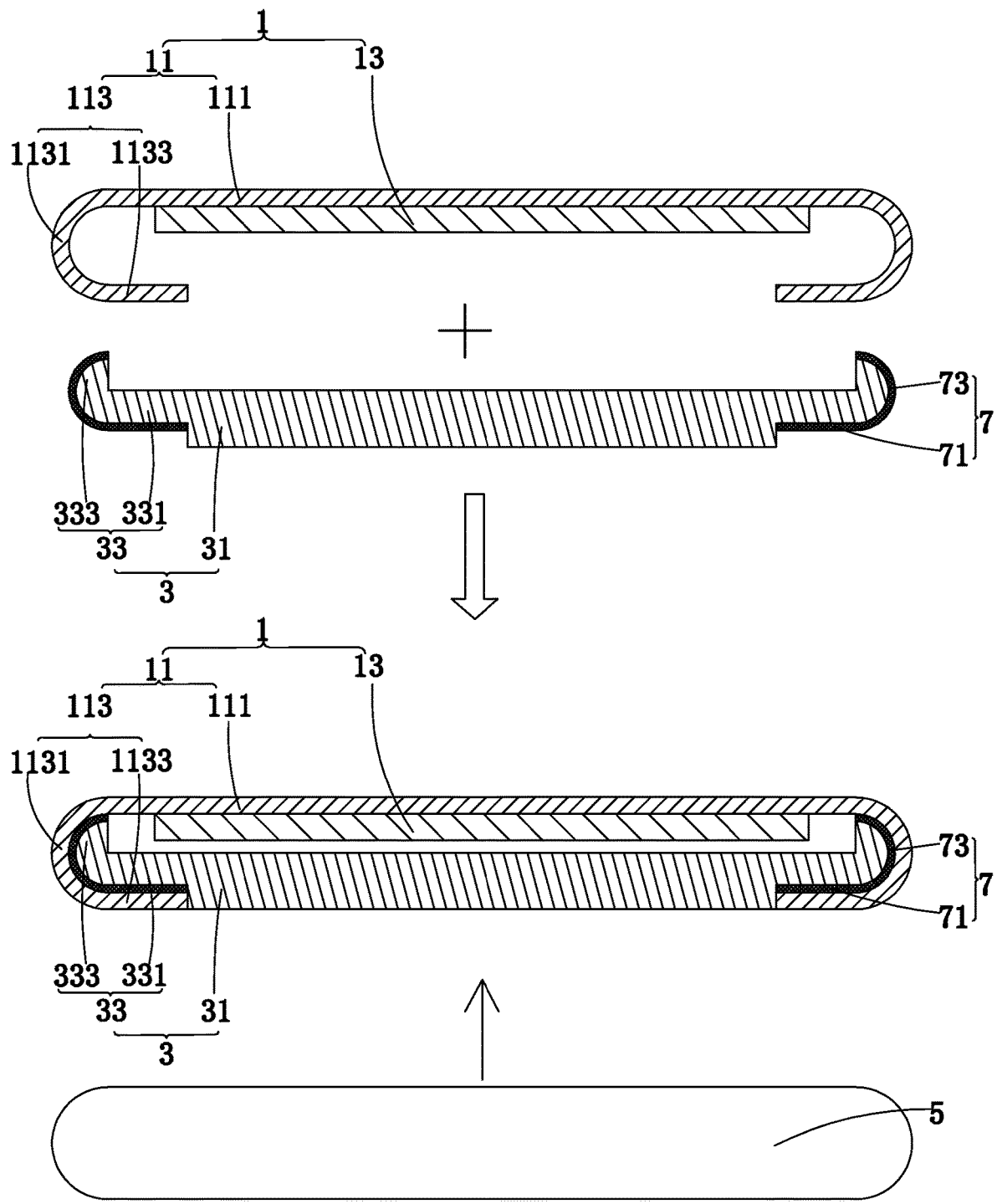
FIG. 2 is a schematic cross-sectional view of an assembly process of a terminal according to the present invention.
Figure 3:
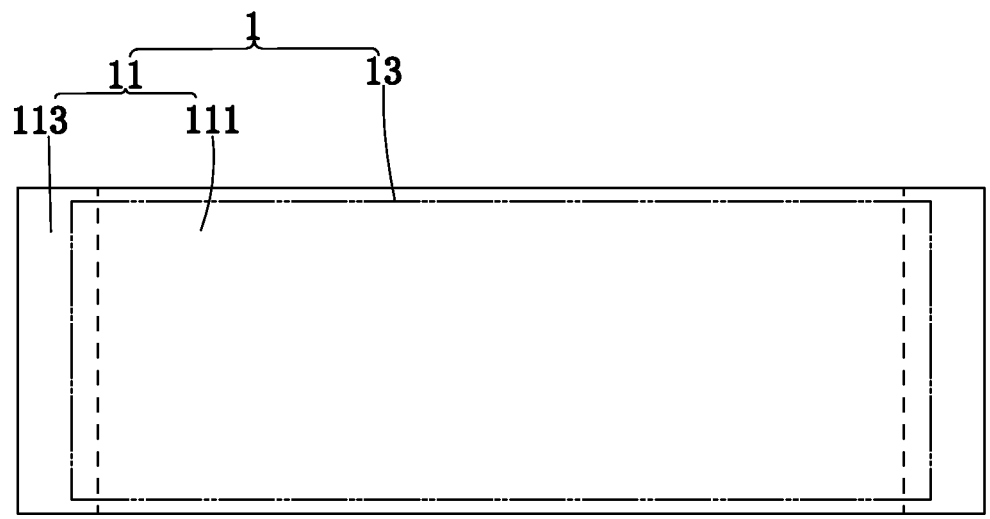
FIG. 3 is a schematic plan view of a terminal body embedding into a display module according to the present invention.
Figure 3:
Figure 3:
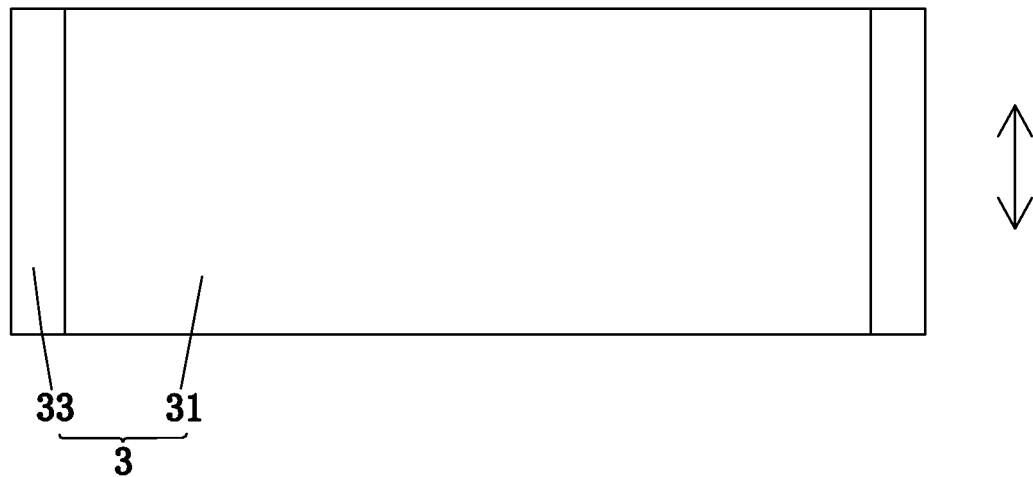

With reference to FIG. 1 to FIG. 3, the present invention provides a terminal, including a display module 1, a terminal main body 3, and two sealing elements 5.

The display module 1 includes a transparent protection cover 11 and a display panel 13. The protection cover 11 includes a first main portion 111 and two extension portions 113 that are opposite, disposed separately and extended from two ends of the first main portion 111, and the first main portion 111 and the two extension portions 113 are enclosed to form a receiving space. The display panel 13 is mounted on a lower surface of the first main portion 111 by adhering.

Specifically:

a material of the protection cover 11 is glass; the display panel 13 is not limited to an LCD display panel or an OLED display panel.

Each of the extension portions 113 includes a first connection portion 1131 and a first extension portion 1133. The first connection portion 1131 is connected between the first extension portion 1133 and the first main portion 111. The first extension portion 1133 and the first main portion 111 are disposed oppositely.

The terminal main body 3 is the main part except for the display panel, and a control circuit and various functional modules are provided in the terminal main body 3, which will not be described in detail. The terminal main body 3 is mounted in the receiving space by an embedding method. The terminal main body 3 includes a second main portion 31 and two protrusion portions 33 that are opposite, disposed separately, and extended from two ends of the second main portion 31. Both the second main portion 31 and the two protrusion portions 33 are mounted in the receiving space.

Specifically, each of the protrusion portions 33 includes a second connection portion 331 and a second extension portion 333, and the second connection portion 331 is connected between the second main portion 31 and the second extension portion 333. The second extension portion 333 is supported by the first connection portion 1131, and the second connection portion 331 is supported by the first extension portion 1133.

The shape and size of the protrusion portion 33 of the terminal main body 3 are compatible with the shape and size of the extension portion 113 of the protection cover 11. Further, as shown in FIG. 1 and FIG. 2, a cross section of the first connection portion 1131 of the extension portion 113 is curve-shaped, such as a circular arc shape, a semicircular shape, and a U shape, etc. Correspondingly, a cross section of the second extension portion 333 of the protrusion 33 is also curve-shaped. The longitudinal section of the first extension portion 1133 of the extension portion 113 is flat. Correspondingly, a cross section of the second connection portion 331 of the protrusion portion 33 is also flat, and a lower surface of the second main portion 31 is aligned with a lower surface of the first extension portion 1133. In addition, a cross section of the first extension portion 1133 of the first extension portion 113 may also be arc-shaped (not shown). Correspondingly, the cross section of the second connection portion 331 of the protrusion portion 33 is also arc-shaped. A lower surface of a cross section of the second main portion 31 is arc-shaped, and a lower surface of the second main portion 31 connects the lower surface of the first extension portion 1133 in order to form an arc shape with a smooth transition.

Furthermore, between the protrusion portion 33 of the terminal main body 3 and the extension portion 113 of the protection cover 11, a flexible buffering part 7 made of a flexible material such as rubber or foam is provided. Accordingly, when the protrusion portion 33 of the terminal main body 3 is embedded into the extension portion 113 of the protection cover 11, the flexible buffering part 7 has a buffering effect generated between the protrusion portion 33 of the terminal main body 3 and the extension portion 113 of the protection cover 11. After the protrusion portion 33 of the terminal main body 3 is embedded in the extension portion 113 of the protection cover 11, the flexible buffering part 7 has a buffering and sealing function between the protrusion portion 33 of the terminal main body 3 and the extension portion 113 of the protection cover 11.

Specifically, the flexible buffering part 7 includes a first portion 71 and a second portion 73. The first portion 71 is located between the first extension portion 1133 of the extension portion 113 and the second connection portion 331 of the protrusion portion 33. The second portion 73 is located between the first connection portion 1131 of the extension portion 113 and the second extension portion 333 of the protrusion portion 33. A shape of the longitudinal cross section of the first portion 71 is the same as a shape of each of the longitudinal cross section of the first extension portion 1133 of the extension portion 113 and the second connection portion 331 of the protrusion portion 33, and a shape of the longitudinal section of the second portion 73 is the same as a shape of each of the longitudinal section of the first connection portion 1131 of the extension portion 113 and the second extension portion 333 of the protrusion portion 33.

The two sealing elements 5 are mounted on two sides of the protection cover 11 and the terminal main body 3 by buckling or screws. A material of the sealing element is plastic or metal, and the outer contour of the sealing element 5 is coincided with an upper surface of the first main portion 111 of the protection cover 11, an outer surface of the extension portion 113 of the protection cover 11 and a lower surface of the second main portion 31 of the terminal main body 3. Accordingly, after the sealing elements 5 are mounted on two sides of the protection cover 11 and the terminal main body 3, the sealing elements 5 can have a sealing function to prevent dust from entering the terminal main body 3 and the display panel 13.

When the user accidentally drops the terminal and causes the display panel 13 to be broken such that the display panel needs to be replaced, the user only needs to remove the sealing member 5 first, and then drawing out the terminal main body 3 from the receiving space of the protection cover 11 to disassemble the display panel 13. Then the terminal main body 3 is embedded in a receiving space of a new protection cover 11, and fixing the seal elements 5 at two sides of the protection cover 11 and the terminal main body 3. The installation of the new display panel 13 can be completed so that the terminal of the present invention can facilitate the assembly and disassembly of the display panel, and the installation and removal of the display panel will not affect the overall appearance of the terminal and facilitate the user to replace the display panel.

In summary, the terminal of the present invention is provided with a display module, a terminal main body, and two sealing elements. Wherein the display module includes a transparent protection cover and a display panel, and the display panel is mounted on a lower surface of the first main portion. Wherein the terminal main body is mounted in the receiving space, the terminal main body includes a second main portion, and the second main portion is connected between the two extension portions. Wherein the two sealing elements are mounted on both sides of the protection cover and the terminal main body. When installing the display panel, only the terminal main body needs to be embedded in the receiving space of the protection cover, and then the sealing member can be fixed. When the display screen is disassembled, only the sealing member needs to be removed first, and then the terminal main body is removed from the receiving space of the protection cover, which can facilitate the assembly and disassembly of the display panel, and the installation and disassembly of the display panel will not affect the overall appearance of the terminal and facilitate the user to replace the display panel.

The above embodiments of the present invention are only exemplary, however, the present invention is not limited. The person skilled in the art can understand: without exceeding the principle and spirit of the present invention, the above embodiments can be improved, wherein the scope of the present invention is limited in the claims and the equivalents of the claims.

What is claimed is:

1. A terminal, comprising:
a display module, a terminal main body, and two sealing elements;
wherein the display module includes a transparent protection cover and a display panel, the protection cover includes a first main portion and two extension portions that are opposite, disposed separately and extended from two ends of the first main portion, the first main portion and the two extension portions are enclosed to form a receiving space, and the display panel is mounted on a lower surface of the first main portion;
wherein the terminal main body is mounted in the receiving space, the terminal main body includes a second main portion, and the second main portion is connected between the two extension portions; and
wherein the two sealing elements are mounted on both sides of the protection cover and the terminal main body;
wherein each of the extension portions includes a first connection portion and a first extension portion, the first connection portion is connected between the first extension portion and the first main portion, and the first extension portion and the first main portion are disposed oppositely;
wherein the terminal main body further includes two protrusion portions that are opposite, disposed separately, and extended from two ends of the second main portion, and the two protrusion portions are mounted in the receiving space; each of the protrusion portions includes a second connection portion and a second extension portion, and the second connection portion is connected between the second main portion and the second extension portion, the second extension portion is supported by the first connection portion, and the second connection portion is supported by the first extension portion.

2. The terminal according to claim 1, wherein a flexible buffering part includes a first portion and a second portion, the first portion is located between the first extension portion and the second connection portion, and the second portion is located between the first connection portion and the second extension portion.

3. The terminal according to claim 2, wherein a cross section of the first connection portion is curve-shaped, and a cross section of each of the second portion and the second extension portion is also curve-shaped.

4. The terminal according to claim 3, wherein a cross section of the first extension portion is flat, a lower surface of the second main portion is aligned with a lower surface of the first extension portion.

5. The terminal according to claim 3, wherein a cross section of the first extension portion is arc-shaped, a lower surface of a cross section of the second main portion is arc-shaped, and a lower surface of the second main portion connects the lower surface of the first extension portion to form an arc shape with a smooth transition.

6. The terminal according to claim 2, wherein the buffering part is rubber or foam.

7. The terminal according to claim 1, wherein the display panel is an LCD display panel or an OLED display panel.

8. The terminal according to claim 1, wherein the two sealing elements are mounted on two sides of the protection cover and the terminal main body by buckling or screws.

* * * * *